US012596758B2

(12) United States Patent
Mishra et al.

(10) Patent No.: US 12,596,758 B2
(45) Date of Patent: *Apr. 7, 2026

(54) IoT ENHANCED SEARCH RESULTS

(71) Applicant: Microsoft Technology Licensing, LLC, Redmond, WA (US)

(72) Inventors: Abhineet Mishra, Bothell, WA (US); Venkata Madhu Sravanth Kurumaddali, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,953

(22) Filed: Jul. 10, 2024

(65) Prior Publication Data

US 2024/0362284 A1 Oct. 31, 2024

Related U.S. Application Data

(63) Continuation of application No. 15/950,936, filed on Apr. 11, 2018, now Pat. No. 12,093,330.

(51) Int. Cl.
| *G06F 7/00* | (2006.01) |
| *G06F 16/00* | (2019.01) |
| *G06F 16/2457* | (2019.01) |
| *G06F 16/3329* | (2025.01) |
| *G06F 16/9535* | (2019.01) |

(52) U.S. Cl.
CPC .... *G06F 16/9535* (2019.01); *G06F 16/24578* (2019.01); *G06F 16/3329* (2019.01)

(58) Field of Classification Search
None
See application file for complete search history.

(56) References Cited

U.S. PATENT DOCUMENTS

| 2011/0246456 A1* | 10/2011 | Weitz | G06F 16/951 |
| | | | 707/730 |
| 2015/0161128 A1* | 6/2015 | Goel | G06F 16/9577 |
| | | | 707/726 |
| 2015/0324454 A1* | 11/2015 | Roberts | G06F 16/24578 |
| | | | 707/734 |
| 2016/0117604 A1* | 4/2016 | Frosst | G06N 5/02 |
| | | | 706/12 |
| 2017/0286491 A1* | 10/2017 | Kaissi | G06F 16/24566 |
| 2018/0095967 A1* | 4/2018 | Kota | G06Q 30/0256 |

OTHER PUBLICATIONS

Corrected Notice of Allowance mailed on Jul. 6, 2021, in U.S. Appl. No. 16/044,112, 11 Pages.
Notice of Allowance mailed on Jun. 30, 2021, in U.S. Appl. No. 16/044,112, 14 pages.

(Continued)

*Primary Examiner* — Tuan A Pham
(74) *Attorney, Agent, or Firm* — Rainier Patents, P.S.

(57) ABSTRACT

The discussion relates to providing more relevant search results to a user based upon information relating to IoT devices associated with the user. One example can receive search results for a search query associated with the user. The example can obtain entities from IoT devices associated with the user and rank the search results utilizing the entities from the IoT devices.

20 Claims, 11 Drawing Sheets

(56) References Cited

OTHER PUBLICATIONS

Office Action Received for Chinese Application No. 201980024982.
9, mailed on Dec. 5, 2024, 2 pages. (English Translation not
Provided).
Non-Final Office Action mailed on Feb. 5, 2025, in U.S. Appl. No.
17/942,349, 32 pages.
Notice of Allowability mailed on Oct. 3, 2025, in U.S. Appl. No.
17/942,349, 05 Pages.
Intimation of Grant Received for Indian Application No. 202047037741,
mailed on Nov. 6, 2025, 01 Page.

* cited by examiner

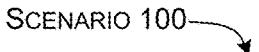

SCENARIO 100

INSTANCE ONE – TRADITIONAL SEARCH SCENARIO

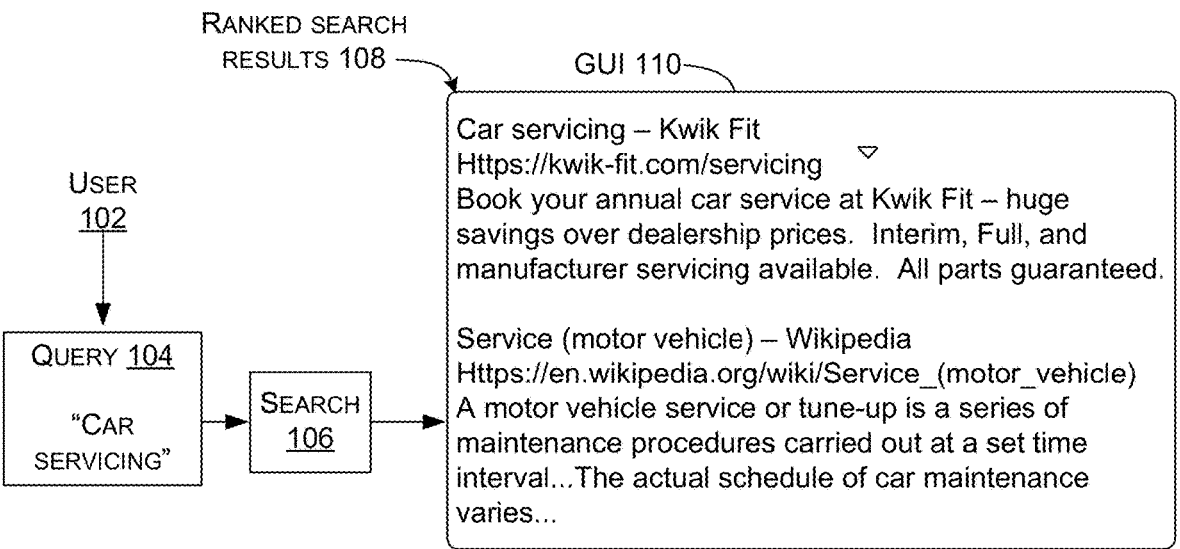

RANKED SEARCH
RESULTS 108

GUI 110

USER
102

QUERY 104

"CAR
SERVICING"

SEARCH
106

Car servicing – Kwik Fit
Https://kwik-fit.com/servicing
Book your annual car service at Kwik Fit – huge
savings over dealership prices. Interim, Full, and
manufacturer servicing available. All parts guaranteed.

Service (motor vehicle) – Wikipedia
Https://en.wikipedia.org/wiki/Service_(motor_vehicle)
A motor vehicle service or tune-up is a series of
maintenance procedures carried out at a set time
interval...The actual schedule of car maintenance
varies...

INSTANCE TWO – IoT AUGMENTED SEARCH SCENARIO

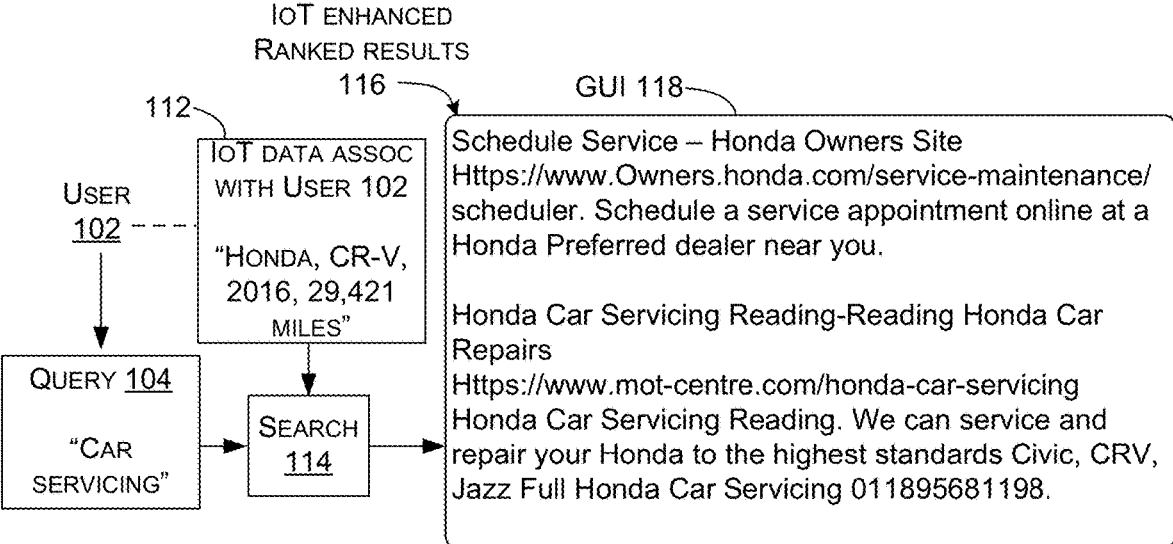

IoT ENHANCED
RANKED RESULTS
116

GUI 118

112

USER
102

IoT DATA ASSOC
WITH USER 102

"HONDA, CR-V,
2016, 29,421
MILES"

QUERY 104

"CAR
SERVICING"

SEARCH
114

Schedule Service – Honda Owners Site
Https://www.Owners.honda.com/service-maintenance/
scheduler. Schedule a service appointment online at a
Honda Preferred dealer near you.

Honda Car Servicing Reading-Reading Honda Car
Repairs
Https://www.mot-centre.com/honda-car-servicing
Honda Car Servicing Reading. We can service and
repair your Honda to the highest standards Civic, CRV,
Jazz Full Honda Car Servicing 011895681198.

FIG. 1

IoT ENTITY SCHEMA 802

SUGGESTED TASKS FROM IOT ENHANCED RANKED RESULTS 1002

IOT ENHANCED RANKED RESULTS 116

CONFIDENCE THRESHOLD 1004

IDENTIFY TASK 1006

EXTRACT IOT ENTITY 1008

SUGGESTED TASKS 1010

DEVICE 204

METHOD 1100

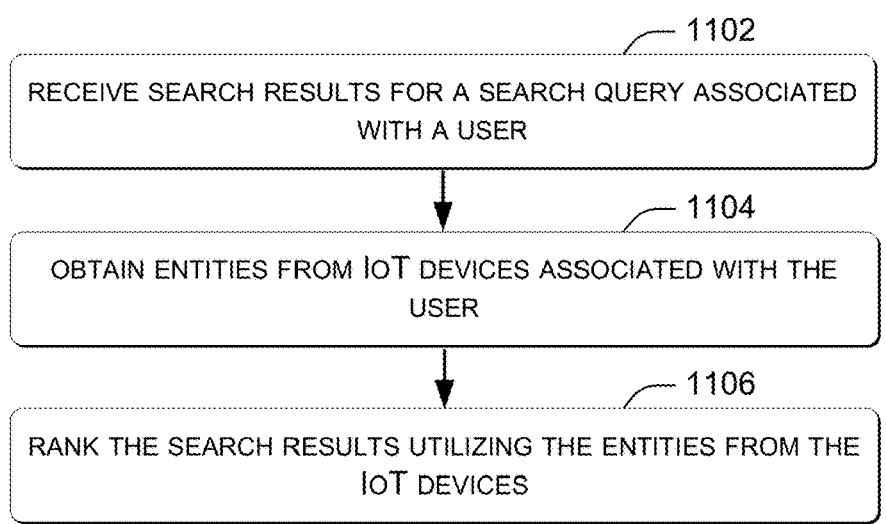

┌─ 1102
RECEIVE SEARCH RESULTS FOR A SEARCH QUERY ASSOCIATED WITH A USER

┌─ 1104
OBTAIN ENTITIES FROM IoT DEVICES ASSOCIATED WITH THE USER

┌─ 1106
RANK THE SEARCH RESULTS UTILIZING THE ENTITIES FROM THE IoT DEVICES

FIG. 11

METHOD 1200

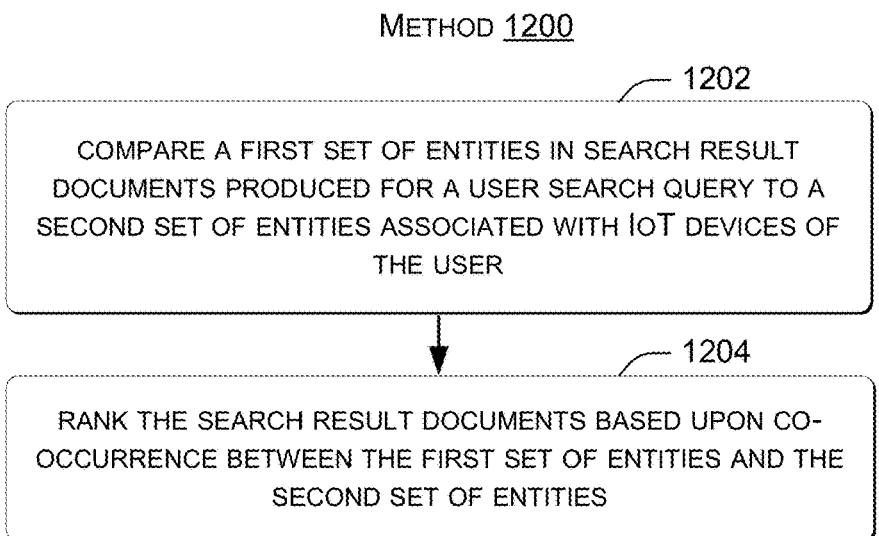

┌─ 1202
COMPARE A FIRST SET OF ENTITIES IN SEARCH RESULT DOCUMENTS PRODUCED FOR A USER SEARCH QUERY TO A SECOND SET OF ENTITIES ASSOCIATED WITH IoT DEVICES OF THE USER

┌─ 1204
RANK THE SEARCH RESULT DOCUMENTS BASED UPON CO-OCCURRENCE BETWEEN THE FIRST SET OF ENTITIES AND THE SECOND SET OF ENTITIES

FIG. 12

IoT ENHANCED SEARCH RESULTS

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases, parentheticals are utilized after a reference number to distinguish like elements. Use of the reference number without the associated parenthetical is generic to the element. Further, the left-most numeral of each reference number conveys the figure and associated discussion where the reference number is first introduced.

FIGS. 1-4 show example IoT enhanced search scenarios in accordance with some implementations of the present concepts.

FIGS. 11 and 12 show flowcharts of example methods that can implement some of the present concepts in accordance with some implementations.

DETAILED DESCRIPTION

Figure 2:
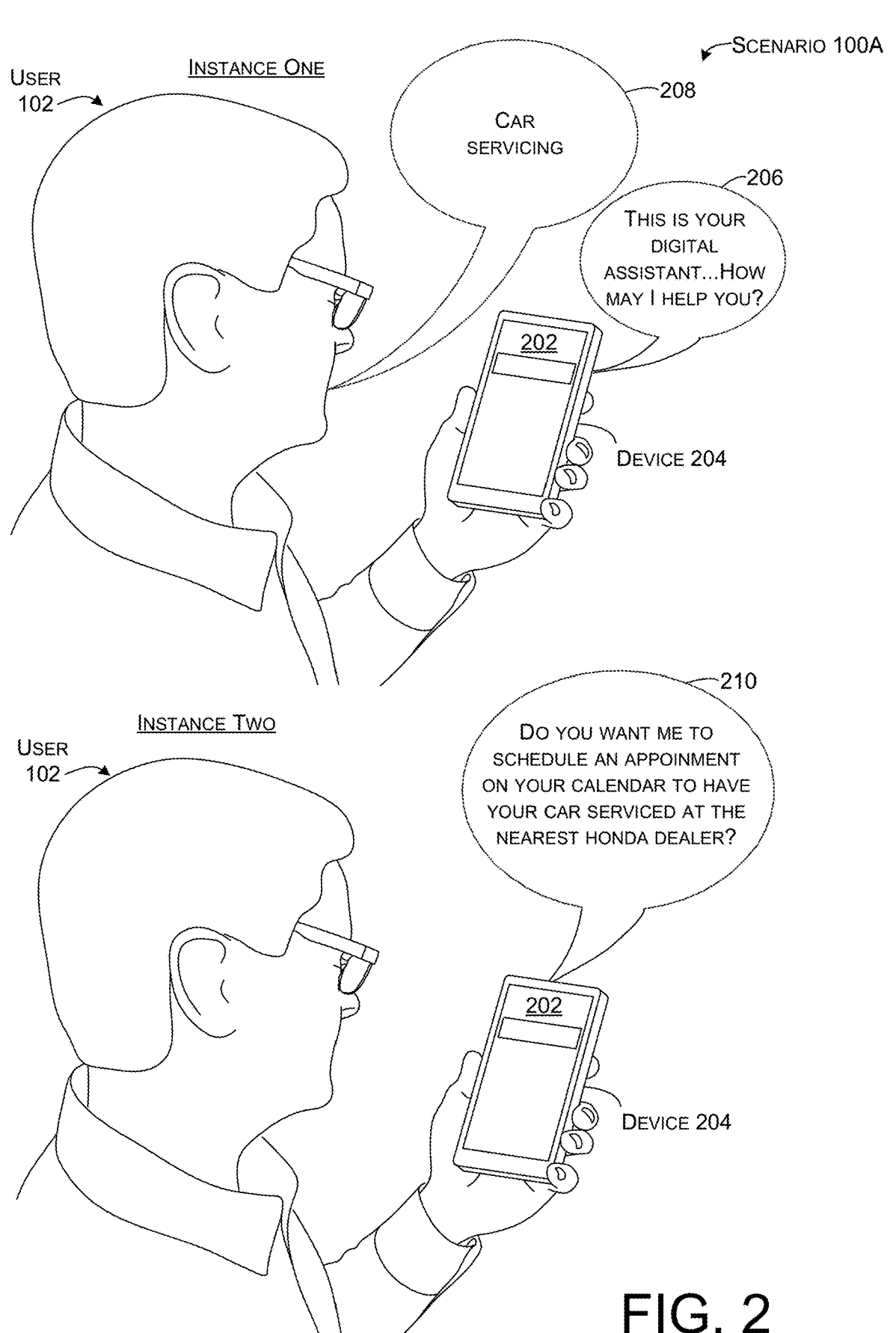

Over the last several decades users utilized a computer to access technologies offered by the Internet. For instance, the user entered a search query via their desktop computer, notebook computer, or smartphone and received generic search results for the search query. Now, other devices, such as cars, refrigerators, furnaces, wearables, medical devices, etc. are becoming computerized and are able to communicate over networks. These devices are referred to as Internet of Things (IoT) devices. The user may be associated with many of these IoT devices in his/her day to day life without even knowing it. The present concepts can utilize data from these IoT devices to enhance user experiences. For example, the user's search query can be augmented with this IoT data to provide more relevant search results than are obtained in the traditional scenario. Further, the more relevant search results can be obtained without any extra effort on the user's part.

Introductory FIG. 1 shows an example scenario 100 where a user experience can be enhanced by leveraging IoT data. In this case, the user experience relates to an Internet search. Instance One shows a traditional search scenario and Instance Two shows an IoT augmented search scenario.

Looking at Instance One, user 102 enters a search query 104. In this example the search query 104 is "car servicing." A search is performed on the search query at 106. For instance, the search can be performed by a search engine. High ranking results of the search can be surfaced at 108. In this example, the high ranking results are surfaced visually on a graphical user interface (GUI) 110. The top result (e.g., highest ranked result) relates to a car servicing shop named Kwik Fit. The next result relates to a Wikipedia entry that explains service as it relates to motor vehicles.

Instance Two shows the same user 102 submitting the same search query 104 of "car servicing." However, in this case at 112 IoT data associated with user 102 is automatically used to augment the search query 104 in the search 114. In this example, the IoT data is from the user's car and includes "Honda, CR-V, 2016, 29,421 miles" (e.g., the make, model, year, and miles of the user's car). The IoT enhanced ranked search results 116 presented on GUI 118 reflect both the search query and the IoT data. In this example, the highest ranked search result relates to a Honda owners site and how to schedule service. The next result relates to a shop that services Hondas in the Reading geographical area (e.g., the geographical area of the user (of the user's device)).

Thus, in Instance Two, the IoT data 112 combined with the search query 104 provided IoT enhanced search results 116 to the user that are more relevant than the search results 108 obtained in Instance One. Yet, the user entered the same search query 104. The user didn't have to enter the information about their car. The IoT enhanced search results 116 are automatically based upon this information. (Note that Applicant does not have any relation to Honda Corp., Kwik Fit, or any other entities mentioned in this document. Real life entities and objects are mentioned wherever possible solely to aid the reader in understanding the present concepts).

FIG. 2 shows another example scenario 100A where a user experience can be enhanced by leveraging IoT data. In this case, user 102 is interacting with a digital assistant (represented at 202) on his computing device 204, which is manifest as a smart phone. At Instance One, the digital assistant asks " . . . how may I help you?" at 206. The user responds, "car servicing" at 208.

Figure 10:
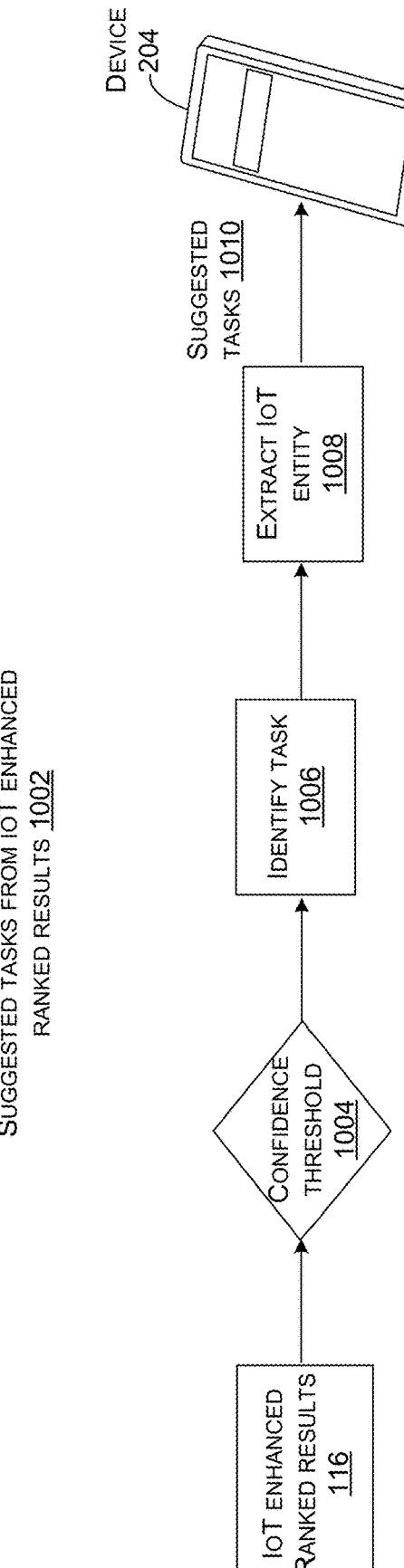

At Instance Two, the digital assistant 202 responds at 210, "Do you want me to schedule an appointment on your calendar to have your car serviced at the nearest Honda dealer?" In a similar manner to FIG. 1, in this scenario, the digital assistant has augmented the user's spoken utterance with IoT data associated with the user to provide a more meaningful response to the user. The more meaningful response considers not only scheduling a car service appointment for the user, but also what kind of shop to make the appointment (Honda dealer) and proximity considerations (nearest such Honda dealer). This response is more useful for the user and yet was obtained without any additional effort on the user's part. An example architecture for accomplishing the enhanced task generation of FIG. 2 is described below relative to FIG. 10.

Figure 3:
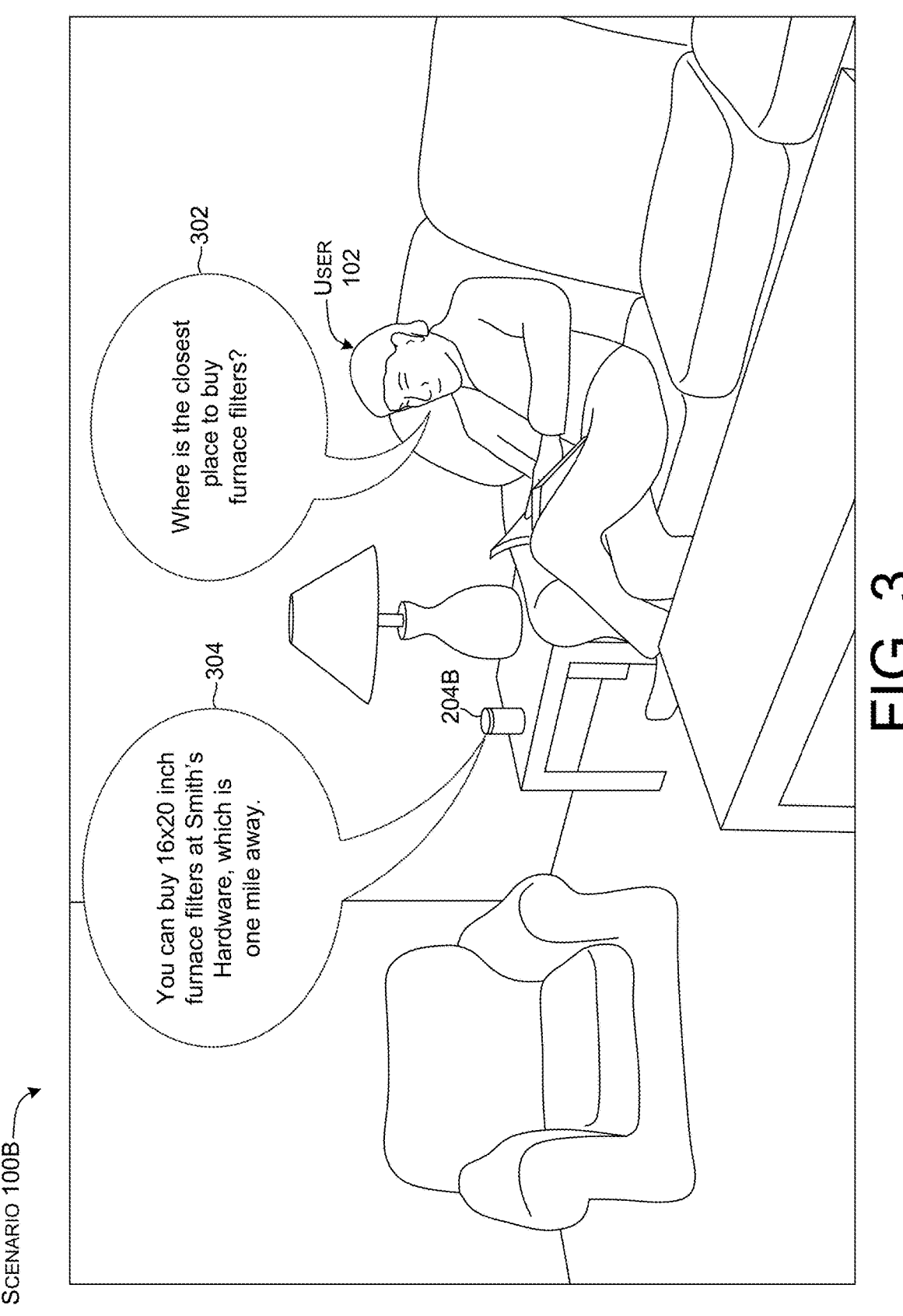

FIG. 3 shows another example scenario 100B where a user experience can be enhanced by leveraging IoT data. In this case, user 102 remembers that he hasn't replaced his home's furnace filter in a while. The user queries in natural language "Where is the closest place to buy furnace filters?" at 302. This search query is picked up by the user's computer 204B, which is manifest as a smart speaker. The smart speaker 204B can facilitate a search and responds "You can buy 16×20 inch furnace filters at Smith's Hardware, which is a mile away." as indicated at 304. In this case the smart speaker 204B augmented the user's query with IoT data from the user's furnace to obtain more relevant results for the user (e.g., what size filter he needs). The user 102 did not have to try to remember what size filter his furnace uses or crawl in the attic to find what size filter his furnace uses. The smart speaker 204B obtained this information relating to the IoT device in the furnace to obtain enhanced search results for the user that were more useful and convenient for the user than would traditionally be obtained for the user's search query.

Figure 4:
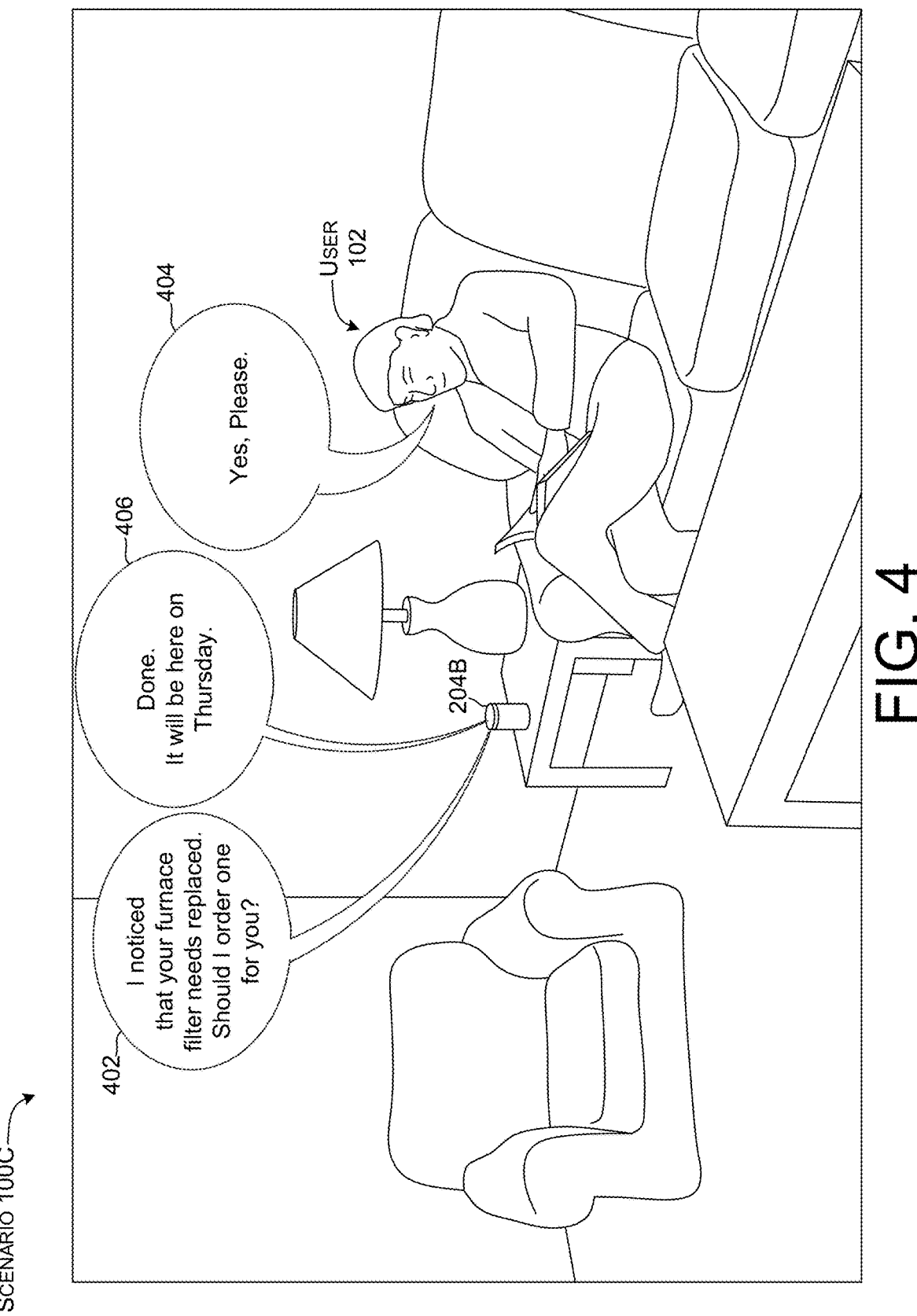

FIG. 4 shows another example scenario 100C where the user experience can be enhanced by leveraging IoT data. In this case, smart speaker 204B receives IoT data relating to the user's furnace (introduced above relative to FIG. 3). The IoT data can include information such as the brand and model of the furnace, size of filter, and an indication that the furnace needs a new filter (e.g., is experiencing reduced airflow rates). The smart speaker 204B can utilize this IoT data to automatically initiate a search query to obtain a new filter. The smart speaker 204B can inquire with the user "I noticed that your furnace filter needs replaced. Should I order one for you?" as indicated at 402. User 102 responds "Yes. Please." at 404. The smart speaker can order the furnace filter for the user and respond "Done. It will be here on Thursday." as indicated at 406.

In this example, IoT data was used by the smart speaker to instigate an inquiry to the user. The smart speaker was then able to use the IoT data to automatically request an IoT enhanced search on the user's behalf without the user having to know anything about the furnace and what kind of filters it used. Thus, without any effort on the user's part (except for responding "Yes. Please.") the smart speaker was able to save the user time and hassle and likely money through more efficient furnace operation with the new filter.

From one perspective, the above examples can integrate the user with the growing cluster of IoT devices associated with the user. Recent advances in wireless networks and IoT devices are becoming an integral part of the human experience. These IoT devices can vary from the user's smart furnace, smart car, smart tv, and so on. These IoT devices can reflect the user's interests, what he/she does, and/or what his/her choices are. While the proliferation of IoT devices accelerates, there has been little exploration of how to utilize this information to improve the search ranking which has become a generic knowledge retrieval platform used by millions of internet users on a daily basis. The present implementations offer an improved and personalized ranking system that utilizes the user's IoT data in a knowledge graph, such as a search engine's index, to further improve the ranking of web results that meet their interests. The enhanced ranking implementations can use the user's IoT data and their relevance score at the search engine re-ranking level to provide more relevant search results. Example systems that can achieve these facets are described in more detail below relative to FIGS. 5-9.

Figure 5:
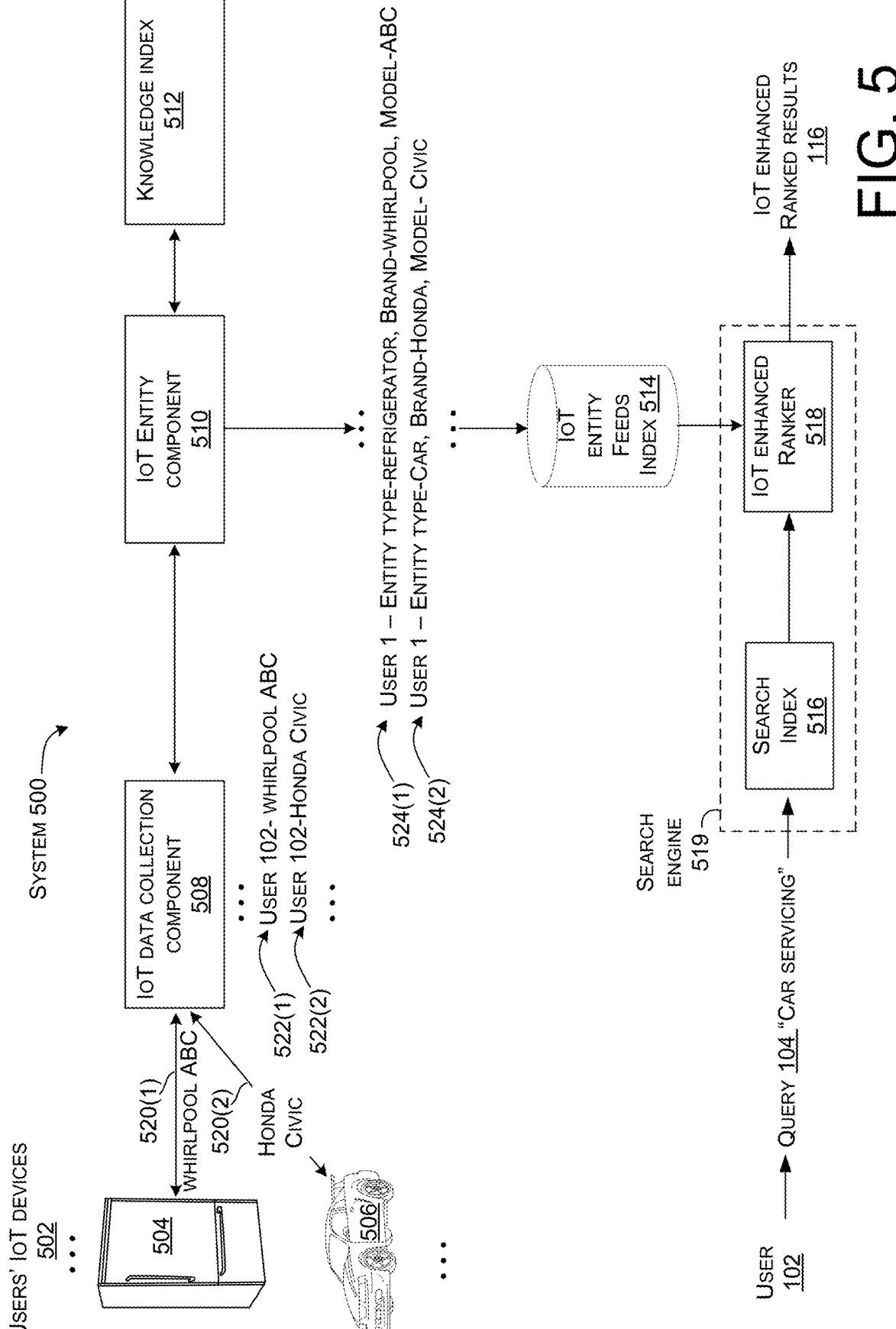
FIG. 5-10 show example IoT enhanced search systems in accordance with some implementations of the present concepts.

FIG. 5 shows an IoT enhanced search system 500. The system 500 can include and/or communicate with users' IoT devices 502 (e.g., IoT devices associated with various users). In the illustrated example the users' IoT devices 502 include a refrigerator 504 and a car 506 that are associated with user 102. For sake of brevity only two IoT devices relating to one user are illustrated for purposes of explanation. Further, this example shows a one-to-one relationship between items and IoT devices (e.g., a car includes a single IoT device). However, a single item could include multiple IoT devices. For instance, a car could have an IoT device for its electrical system, an IoT device for its emission system, an IoT device for its fuel system, etc. Thus, a real-world implementation may include billions of IoT devices associated with millions of users and system 500 is configured to handle such an implementation.

System 500 can include and/or communicate with an IoT data collection component 508, an IoT entity component 510, a knowledge graph or index 512, an IoT entity feeds index 514, a search index 516, and/or an IoT enhanced ranker 518. In this example, the search index 516 and the IoT enhanced ranker 518 can be provided by a search engine 519, but other configurations are contemplated.

IoT data collection component 508 can be viewed as a central hub where sensor data from users' IoT devices 502 is communicated at 520. For instance, in this example, the IoT data 520 includes "Whirlpool ABC" at 520(1). (Note "ABC" is a contrived model of refrigerator). The IoT data 520 also includes "Honda Civic" at 520(2). For sake of brevity the amount of IoT device data in the illustrated example is relatively brief. However, more extensive IoT device could be conveyed. For instance, relative to the Honda, the IoT device data could include mileage, status of various systems, percent of oil life remaining, next projected service, etc. The IoT data collection component can associate the IoT data with a particular user. In this case, at 522(1) the "Whirlpool ABC" is associated with user 102. "Honda Civic" is associated with user 102 at 522(2).

In some cases, a client component (not specifically illustrated) can run on the IoT devices 502 and can collect information from the IoT device. The client component can send the information to the IoT data collection component 508. In some of these configurations, the client component can include a push-based notification agent. The push-based notification agent can detect changes in the state of the IoT device and push the updated state to the IoT data collection component 508. The type of information about the IoT device and/or change frequencies can vary based upon device type and/or environment. For instance, a car parked in a garage may send less data and/or send the data less frequently than a car driving down the road.

At this point, the system 500 includes IoT device data 522. However, this IoT device data may not be in a form that is recognized and/or useful in a search context. Stated another way, the IoT device data 522 may not have any value in a search context. From one perspective, the discussion that follows explains techniques for increasing the value of the IoT device data in the search context. From another perspective, one technical problem is that IoT data does not currently exist in a manner that is understood in the highly developed search context. The discussion below provides a technical solution to this problem.

IoT entity component 510 can extract and process the data from IoT data collection component 508. The extraction and processing can entail multiple stages. For instance, one stage can process and ingest the IoT device data 522 in an intermediate store. Another stage can include integration of all IoT device data 522 across different IoT applications to draw correlations. Another stage can entail periodically reading IoT device data 522 from the intermediate store and store it in distributed storage. Another stage can entail deserializing the IoT device data 522 and converting the IoT data into an indexable data format.

In some implementations, the IoT entity component 510 can analyze the IoT device data 522 relative to entity and popularity indexes. Stated another way, this analysis can identify entities in the IoT device data 522. For instance, the IoT entity component 510 can extract entity names from the IoT device data 522 by finding matches between the IoT device data and the entity indexes. The IoT entity component 510 can also employ a popularity index relative to the IoT device data. For example, the popularity index can be populated with various entity information relating to frequency of usage, duration of usage, last time use, novelty factor, and/or brand of entity, among others. For instance, one manifestation of the population graph can include a weighted mean of these facets. Thus, once the IoT entity component identifies an entity in the IoT device data, the IoT entity component can identify how often that entity is accessed, etc. (e.g., what entities does the IoT device data relate to and how interested is the user in individual entities).

IoT entity component 510 can utilize knowledge index 512 to derive additional information about the IoT device data 522. For instance, IoT entities from the IoT device data can be compared to the knowledge index 512. Various knowledge indexes can be employed. Search engine knowledge indexes are readily available. The process can compare entities of the IoT device data to entities of the knowledge index. If an entity match is found, the existing entity ID and metadata from the knowledge index can be utilized by the IoT entity component 510. In an alternative case where the entity is not found, the new IoT entity from the IoT device data can added to the knowledge index for future use.

IoT entity component 510 can also identify related entities (such as parent and/or child relationships (e.g., ontological relationships)) and metadata associated with the IoT entity using N step graph traversal over the knowledge graph 512. Thus, in the illustrated example, the IoT entity component 510 obtains additional information relative to the IoT device data 522. This additional information is reflected at 524 and can be viewed as structured IoT device data (e.g., the IoT device data is augmented with information about the IoT device data).

The structured IoT device data 524 can be compared to the IoT device data 522 for purposes of explanation. As indicated at 524(1) the additional information specifies that "Whirlpool" is an entity of entity type "refrigerator," and "ABC" is a model of Whirlpool refrigerator. Similarly, as indicated at 524(2) the additional information specifies that "Honda" is an entity of entity type "car," and "Civic" is a model of Honda car. Some of this information was in the IoT device data. For instance, "Honda" was in the IoT device data, but without context. The knowledge graph provided information that Honda is an entity. Other information was not in the IoT device data 522 and was derived from the knowledge graph. For instance, the information that the entity Honda has a child relationship to parent entity type of car was derived from the knowledge graph and added to the structured IoT device data 524(2). Thus, from one perspective, the structured IoT device data 524 can add context to the IoT device data 522 that makes the structured IoT device data useful or meaningful in the search context.

Figure 8:
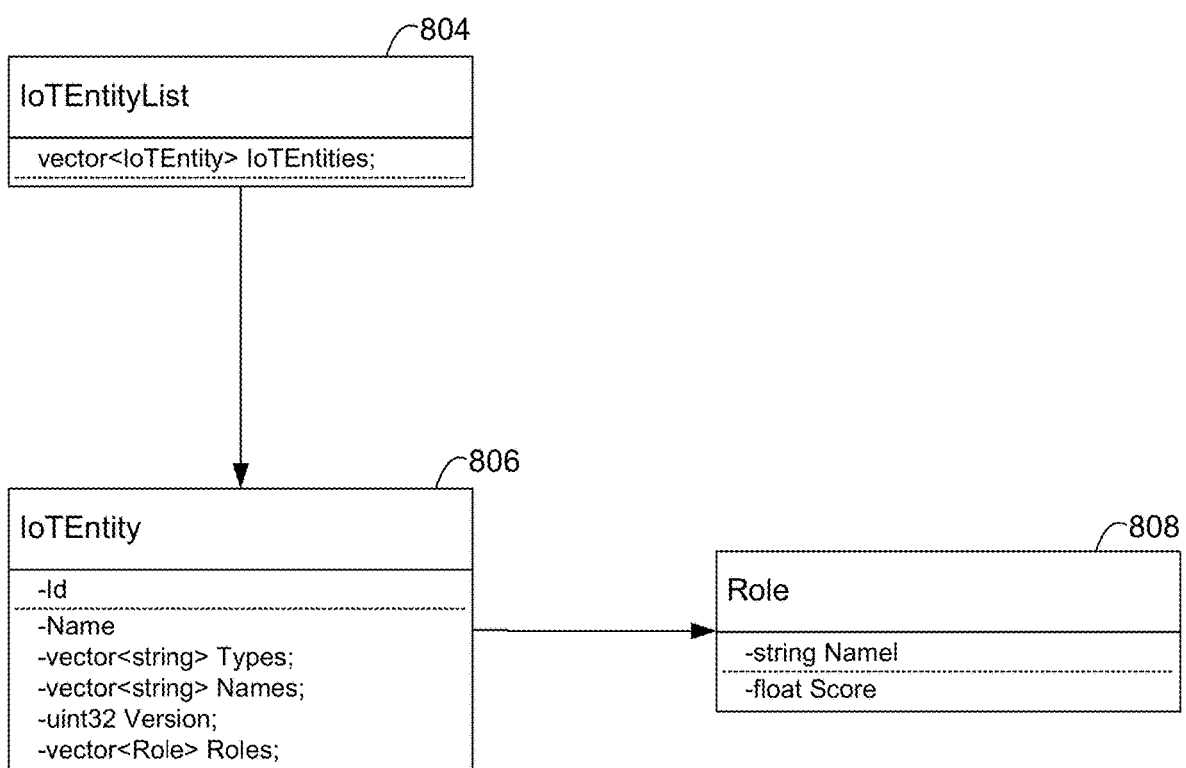

The structured IoT device data 524 can be added to the IoT entity feeds index 514. For instance, in some implementations, the identified entities can be ingested into the IoT entity feeds index 514 with several fields, such as user ID, entity ID, popularity index, etc. In this case, a user ID can be an anonymous unique identifier for the user in the system 500. The entity ID can be the search engine knowledge base unique ID. The popularity index can be a score of relevance which is a measure of trending interest (e.g., relative trending popularity), virality, and/or usefulness. In some implementations, the structured IoT device data 524 can be converted into an indexable data format for the IoT entity feeds index 514. (FIG. 8 shows an IoT entity schema for this conversion).

The discussion of FIG. 5 above that culminates with the IoT entity feeds index 514, explains one strategy for making users IoT device data useful in a search context (e.g., as structured IoT device data 524). The remaining discussion relating to FIG. 5 explains examples for employing the structured IoT device data in a constructive way to provide IoT enhanced ranked results 116 that are more relevant to the user.

In this example, the user 102 submits the query 104 for "car servicing" as introduced in the scenarios above in FIG. 1. This query 104 can be submitted to a search index 516, such as may be associated with a search engine or other search tool. The search index 516 can provide a listing of content (e.g., documents, images, etc.) which are relevant (e.g., contain terms of the query). This aspect is known and as such is not discussed in detail here.

The IoT enhanced ranker 518 can receive the list of content and rank the content at least in part by utilizing the structured IoT device data 524 from the IoT entity feeds index 514. One point of the following discussion is to provide explanation of how the IoT enhanced ranker 518 can utilize the structured IoT device data 524 in a smart manner that improves the search results. For instance, the Whirlpool refrigerator structured IoT device data 524(1) is not likely to provide better results for the car servicing query. In contrast, structured IoT device data 524(2) relating to Honda cars is likely to provide better results than would be obtained traditionally.

Figure 6:
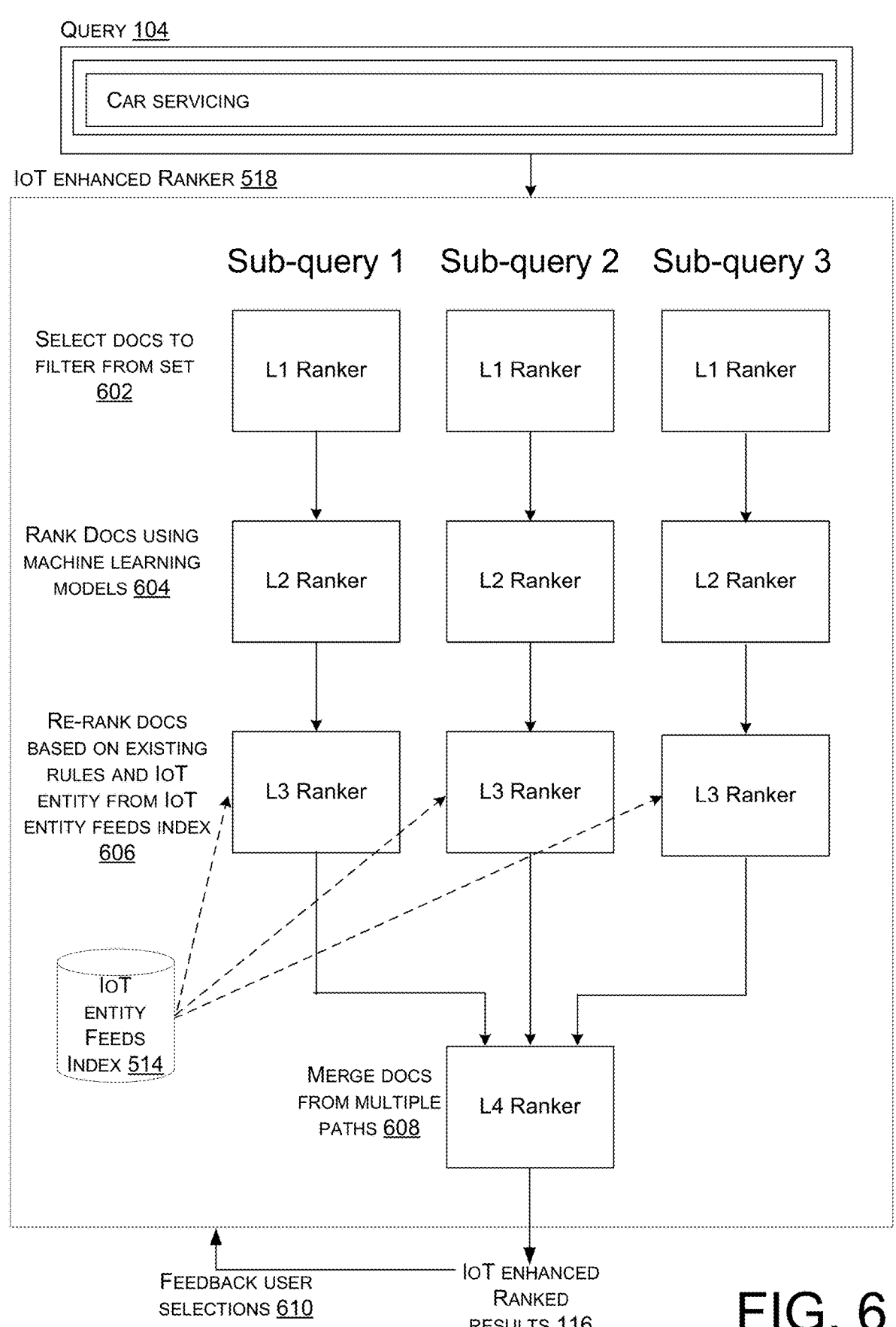

FIG. 6 provides additional detail about example IoT enhanced ranker 518. As mentioned above, the IoT enhanced ranker 518 can receive the car servicing query 104 and output the IoT enhanced ranked results 116. More specifically, the IoT enhanced ranker 518 can receive a list of documents (or document addresses (e.g., web URLs)) that contain one or more query terms. For instance, a knowledge graph can reference query terms to documents. In this case, the IoT enhanced ranker 518 includes parallel feeds for different subqueries of the search query 104. In this case, three parallel feeds (represented by vertical columns) are indicated as sub-query 1, sub-query 2, and sub-query 3. For instance, one sub-query (sub-query 1) could relate to the term "car" from the search query 104 and another sub-query (sub-query 2) could relate to the term "servicing." More or fewer feeds may be employed than the three illustrated here. The illustrated case also includes four ranking levels (e.g., level 1 (L1) to level 4 (L4) represented as horizontal rows). However, other levels of ranking could be used.

In this case, documents from the list of documents obtained from the knowledge graph, can be selected by the level 1 ranker as indicated at 602. The level 1 ranker can output the results to the level 2. The level 2 can rank the documents using machine learning models at 604.

The output of level 2 is fed into level 3. The level 3 ranker can re-rank the documents based on existing rules and/or IoT entities from the IoT entity feeds index 514 as indicated at 606. More specifically, structured IoT device data (524, FIG. 5) can be consumed at level 3. As mentioned above relative to FIG. 5, structured IoT device data can include IoT entities along with popularity scores and/or other metadata. The L3 Ranker can match IoT Entity IDs with entity ID of the documents' URLs (e.g., identify co-occurrences) and boost the confidence if there is a match. Thus, assume that a first document (URL) includes the term servicing and includes the entity 'car' while a second document (URL) includes the term servicing but not the entity 'car.' The entity 'car' is contained in the IoT entity feeds index 514. Stated another way, the entity 'car' occurs in the IoT entity feeds index for this user and occurs in the first document, but not the second document. Thus, this IoT entity is a match with the first document but not the second document. This information can be used to determine that there is a higher likelihood/confidence that the first document matches what the user is really searching for than the second document.

To clarify further, in this case at the L3 ranker level there are likely multiple documents from various car servicing dealers such as Honda, Toyota, Audi, etc. But the IoT entity feeds index 514 returns the 'Honda' entity for this query. Hence the Honda web documents will get a boost in their confidence. Thus, if the first document includes 'Honda,' 'car,' and 'servicing,' and the second document does not include 'Honda,' then the first document can now be ranked higher than the second document even if they were ranked differently coming out of the level 2 ranker.

Also, the IoT enhanced ranker 518 does not produce spurious results from unrelated IoT entities. For instance, in this example, the L3 ranker could look for instances of IoT entities 'refrigerator' "whirlpool', 'Honda' and 'car.' The terms refrigerator and Whirlpool are not likely to occur in documents that are surfaced in a query for the terms "car" and "servicing" and thus do not affect the ranking. In contrast, co-occurrence of IoT entities 'car' and 'Honda' are indicative of highly relevant documents.

In some implementations, this new level 3 confidence value based on the co-occurring IoT entities can be a weighted average of the popularity index and the existing confidence value. The new confidence value can be used for final ranking of URLs during L4 ranker stage. The L4 ranker can merge documents from the multiple paths as indicated at 608 to produce the IoT enhanced ranked results 116. The IoT enhanced ranked results 116 can be presented to the user and/or employed on the user's behalf.

Note that some implementations can employ a self-learning technique. For example, user selections of the IoT enhanced ranked results 116 can be fed back to the IoT enhanced ranker 518 as indicated at 610 to further refine the IoT enhanced ranked results in future instances.

New IoT enhanced ranking systems for search scenarios are discussed above. The new IoT enhanced ranking system can incorporate users' diverse IoT device data. The new approach can intelligently identify the entity of interest from IoT device data, such as by using a search engine knowledge graph. An IoT enhanced ranker can use the IoT entities and their popularity index to provide improved and personalized search results to the user.

Figure 7:
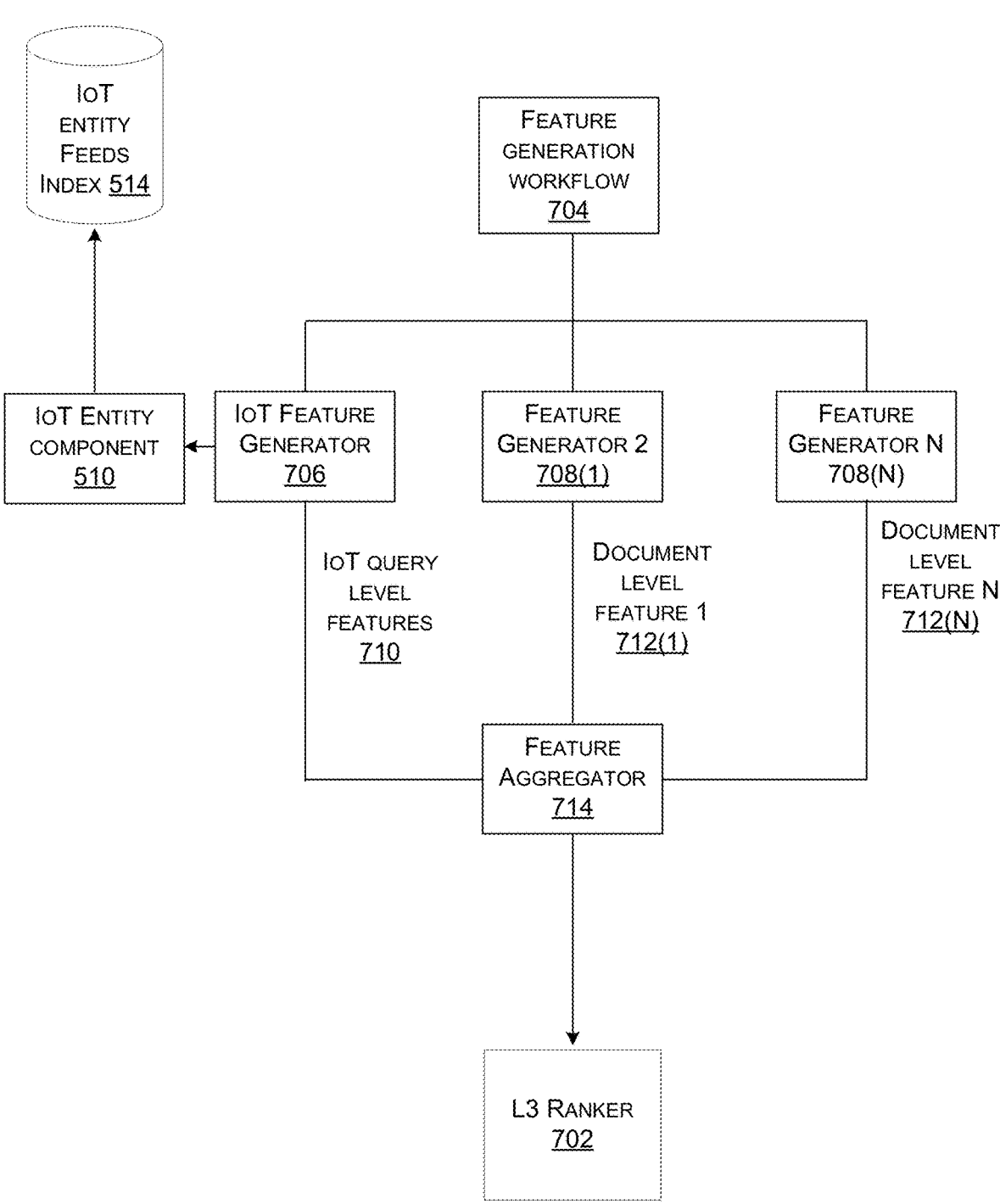

FIG. 7 shows details relating to an example L3 ranker indicated at 702. This particular L3 ranker can be user configurable. The configurable L3 ranker can allow a party to define features that are of interest to the party and that the party wants to be considered for determining confidence levels of documents. For instance, the party may be controlling system 500 of FIG. 5 and/or may be controlling a search engine, among others. In this case, the feature generation workflow starts at 704. The present discussion relates to IoT device data (more specifically IoT entities in the structured IoT device data). The IoT entities can be treated as a feature and can be manifest at IoT feature generator 706. Feature generators 708(1) and 708(N) can also be configured for other features but are not described in detail here. The IoT feature generator 706 can communicate with the IoT entity component 510 and the IoT entity feeds index 514 to obtain the IoT entities utilized by the IoT feature generator. The IoT feature generator 706 can utilize these IoT entities to generate IoT query level features at 710. Similarly, the other feature generators 708 can generate document level features at 712. A feature aggregator 714 can combine the features 710 and 712 to populate the L3 ranker 702. The L3 ranker can then be employed in the IoT enhanced ranker 518 of FIG. 6.

FIG. 8 shows an IoT entity schema 802 mentioned above relative to the discussion of FIG. 5. The IoT entity schema can provide a technique for converting structured IoT device data (524, FIG. 5) into indexable data format for the IoT entity feeds index 514. The indexable data format can relate to entities in an IoT entity list 804, to properties or attributes of the entities at 806, and/or roles of the entities at 808.

In one case, the IoT entity schema 802 can be employed in an index build environment for the IoT entity feeds index (514, FIG. 5). In the index build environment, the generated indexable data format can be processed into the index and content chunks that can be consumed by the IoT entity feeds index. An index as a service environment can download (e.g., stream) the chunk files generated by the index build as they are available. Periodically, the IoT entity feeds index can begin a merge process. During index merge, the index chunk files can be combined into a new, complete version of the IoT entity feeds index.

The discussion above relating to FIGS. 1-8 includes intelligent identification of entities from IoT Sensor Data, such as using a search engine knowledge graph. Indexing of IoT entities can be accomplished in a search index (e.g., IoT entity feeds index) for fast search and retrieval. A popularity score can be generated for each entity using weighted mean of temporal dimensions. A rules-based re-ranking level can be enhanced with IoT entities and their popularity score to improve search results. User selections from the enhanced or improved search results can be used in a feedback loop to improve search engine engagement. The systems can be employed by a party working directly with the user. For instance, a party associated with a search engine could employ the systems to provide better search results. Alternatively, the system can be employed indirectly for a first party working directly for the user. For instance, the system can be employed by a second party and surfaced as an application program interface (API) that is made available to the first party. For example, the first party may be an application developer that is providing an application that the user has on his/her smart phone. The application may receive a search query from the user. The first party can run the search query through the API and get the IoT enhanced ranked results without any knowledge of the processes being performed under the guidance of the second party. One such example is described below relative to FIG. 10.

Figure 9:
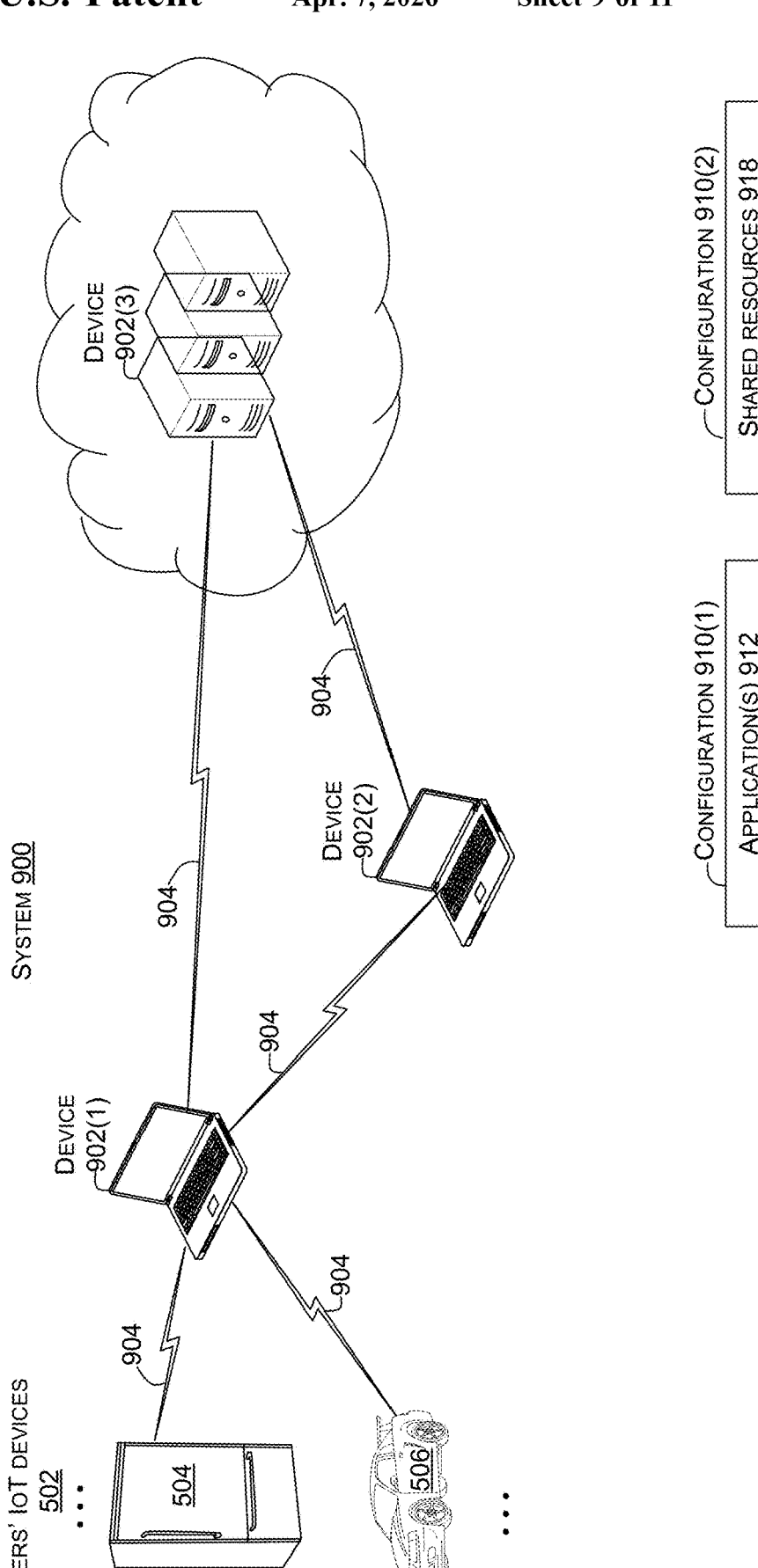

FIG. 9 shows a system 900 that can accomplish IoT enhanced ranked search result concepts. For purposes of explanation, system 900 includes users IoT device 502 including refrigerator 504 and car 506. System 900 can also include one or more devices 902. In the illustrated example, devices 902(1) and 902(2) are manifest as notebook computer devices and example device 902(3) is manifest as a server device. Device 204 of FIGS. 2 and 204B of FIG. 3 can also be viewed as example devices 902. The users' IoT devices 502 and devices 902 can communicate via one or more networks (represented by lightning bolts 904) and/or can access the Internet over the networks. In some cases, parentheticals are utilized after a reference number to distinguish like elements. Use of the reference number without the associated parenthetical is generic to the element.

Devices 902 can be proximate to one another and/or distributed. Further, the device 902 can be proximate to and/or remote from users' IoT device 502.

FIG. 9 shows two device configurations 910 that can be employed by devices 902. Individual devices 902 can employ either of configurations 910(1) or 910(2), or an alternate configuration. (Due to space constraints on the drawing page, one instance of each configuration is illustrated rather than illustrating the device configurations relative to each device 902). Briefly, device configuration 910(1) represents an operating system (OS) centric configuration. Configuration 910(2) represents a system on a chip (SOC) configuration. Configuration 910(1) is organized into one or more applications 912, operating system 914, and hardware 916. Configuration 910(2) is organized into shared resources 918, dedicated resources 920, and an interface 922 there between.

In either configuration 910, the device can include storage/memory 924, a processor 926, and/or an IoT search component 928. The IoT search component 928 can include any or all of the IoT data collection component 508, IoT entity component 510, knowledge index 512, IoT entity feeds index 514, and/or IoT enhanced ranker 518 introduced above in relation to FIG. 5. The IoT search component 928 can be configured to receive search results for a search query entered by an individual user and to obtain the IoT entities from the IoT device data associated with the individual user. The IoT search component 928 can be configured to rank the search results utilizing the IoT entities from the IoT device data associated with the individual user. The IoT search component 928 can provide the user with the ranked search results that are more relevant to the individual user than would be obtained without the entities from the IoT device data.

In some configurations, each of devices 902 can have an instance of the IoT search component 928. However, the functionalities that can be performed by IoT search component 928 may be the same or they may be different from one another. For instance, in some cases, each device's IoT search component 928 can be robust and provide all of the functionality described above and below (e.g., a device-centric implementation). In other cases, some devices can employ a less robust instance of the IoT search component 928 that relies on some functionality to be performed remotely. For instance, device 902(3) may have more processing resources than device 902(1). As such, some of the functionality can be performed locally on device 902(1) and other functionality can be outsourced to device 902(3). Device 902(3) can return the results of its processing to device 902(1).

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs, etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 902 can include traditional computing devices, such as personal computers, desktop computers, servers, notebook computers, cell phones, smart phones, personal digital assistants, pad type computers, mobile computers, smart devices etc. and/or any of a myriad of ever-evolving or yet to be developed types of computing devices.

As mentioned above, configuration 910(2) can be thought of as a system on a chip (SOC) type design. In such a case, functionality provided by the device can be integrated on a single SOC or multiple coupled SOCs. One or more processors 926 can be configured to coordinate with shared resources 918, such as memory/storage 924, etc., and/or one or more dedicated resources 920, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

As mentioned above relative to FIG. 2, FIG. 10 provides an example where suggested tasks can be generated from IoT enhanced search results as indicated at 1002. In this case, a user search query (104, FIG. 1) can be submitted for processing via an API. The API can return IoT enhanced ranked results 116. The IoT enhanced ranked results 116 can be compared to a confidence threshold at 1004. Stated another way, this step can determine the likelihood that the IoT enhanced ranked results 116 convey the intent of the user in performing the search query.

If the IoT enhanced ranked results 116 satisfy the confidence threshold, a task can be identified at 1006 that reflects the IoT enhanced ranked results. For instance, in an example where the search query is "car servicing" and the IoT enhanced ranked results 116 list the highest ranking result as the closest Honda dealer, assume that the confidence threshold 1004 is satisfied. In that case, the identified task can be making an appointment for servicing the user's Honda at the listed Honda dealer. The IoT entity (e.g., Honda) can be extracted from the search results at 1008. Suggested tasks 1010 can be sent to the user's device 204. For instance, the user's device might present visually and/or audibly that it made an appointment for servicing the user's Honda.

FIG. 11 shows a flowchart of an IoT enhanced search results technique or method 1100.

The method can receive search results for a search query associated with a user at 1102.

The method can obtain entities from IoT devices associated with the user at 1104.

The method can rank the search results utilizing the entities from the IoT devices at 1106.

FIG. 12 illustrates a flowchart of IoT enhanced search technique or method 1200.

The method can compare a first set of entities in search result documents produced for a user search query to a second set of entities associated with IoT devices of the user at block 1202.

At block 1204, the method can rank the search result documents based upon co-occurrence between the first set of entities and the second set of entities.

The described methods can be performed by the systems and/or elements described above and/or below, and/or by other devices and/or systems.

The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Various examples are described above. Additional examples are described below. One example includes a system comprising an IoT entity component configured to obtain IoT device data from users and to supply the IoT device data to a knowledge index to identify entities in the IoT device data. The system can also include storage that includes an IoT entity feeds index that includes the entities from the IoT device data associated with the users. The system can also include an IoT enhanced ranker configured to receive search results for a search query entered by an individual user and to obtain the entities from the IoT device data associated with the individual user and to rank the search results utilizing the entities from the IoT device data associated with the individual user.

Another example can include any of the above and/or below examples where the system includes the knowledge index or wherein the IoT entity component is configured to communicate with the knowledge index associated with a third party.

Another example can include any of the above and/or below examples where the IoT entity feeds index can include multiple fields per individual entity.

Another example can include any of the above and/or below examples where individual fields include user identification (ID), entity identification (ID), and/or popularity index.

Another example can include any of the above and/or below examples where the popularity index is a score of relevance that is a measure of trending interest in the individual entity.

Another example can include any of the above and/or below examples where the IoT entity feeds index is stored in indexable data format.

Another example can include any of the above and/or below examples where the search results comprise a list of uniform resource locator (URL) addresses.

Another example can include any of the above and/or below examples where the URL addresses are associated with documents and/or images.

Another example can include any of the above and/or below examples where the IoT enhanced ranker comprises multiple ranking levels.

Another example can include any of the above and/or below examples where an individual ranking level checks for occurrences of the entities in the URLs.

Another example can include any of the above and/or below examples where the individual ranking level re-ranks individual URLs with the occurrences higher than other individual URLs that do not have the occurrences.

Another example includes a method comprising receiving search results for a search query associated with a user, obtaining entities from IoT devices associated with the user, and ranking the search results utilizing the entities from the IoT devices.

Another example can include any of the above and/or below examples where the receiving comprises performing the search on the search query or the receiving comprises receiving the search results from a search engine.

Another example can include any of the above and/or below examples where the obtaining comprises comparing IoT data from the IoT device to a knowledge graph to identify the entities.

Another example can include any of the above and/or below examples where the obtaining comprises obtaining the entities and associated ontological relationships.

Another example can include any of the above and/or below examples where the obtaining comprises obtaining the entities and relative trending popularity.

Another example can include any of the above and/or below examples where the ranking comprises identifying occurrences of the entities in individual search results.

Another example can include any of the above and/or below examples where the ranking comprises ranking the individual search results higher than other individual search results that lack the occurrences.

Another example includes a method comprising comparing a first set of entities in search result documents produced for a user search query to a second set of entities associated with IoT devices of the user and ranking the search result documents based upon co-occurrence between the first set of entities and the second set of entities.

Another example can include any of the above and/or below examples where the ranking comprises ranking individual documents with more co-occurrences higher than other individual documents with less co-occurrences.

Conclusion

Although the subject matter relating to IoT enhanced search results has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   receiving, by a computer, a query provided by a user, the query including one or more query terms;
   obtaining, by an Internet-of-Things (IoT) entity component of the computer, IoT entity data associated with the user;
   obtaining ranked search results based on the query, the ranked search results including a list of documents that include the one or more query terms, the list of documents being ranked based on confidence scores associated with the documents;
   re-ranking, by an IoT enhanced ranker of the computer, the ranked search results by:
      identifying IoT entities in the IoT entity data that match entities in the documents to determine co-occurrences;
      determining popularity scores for the IoT entities based on a popularity index; and
      adjusting the confidence scores associated with the documents based on the co-occurrences and the popularity scores of the IoT entities; and
   outputting at least a subset of the re-ranked search results to be presented to the user, the re-ranked search results including the list of documents ranked based on the adjusted confidence scores.

2. The method of claim 1, wherein the one or more query terms in the query provided by the user do not include the IoT entities associated with the user.

3. The method of claim 1, further comprising:
   obtaining IoT data associated with the user.

4. The method of claim 3, further comprising:
identifying the IoT entities from the IoT data.

5. The method of claim 1, further comprising:
deriving the IoT entities from a knowledge graph.

6. The method of claim 1, wherein one of the documents with more occurrences of the IoT entities is re-ranked higher than another one of the documents with fewer occurrences of the IoT entities.

7. The method of claim 1, further comprising:
generating the popularity index including a frequency of usage, a duration of usage, a last time used, a novelty factor, a brand, a relevance, a trending interest, a virality, or a usefulness of the IoT entities.

8. The method of claim 1, further comprising re-ranking the ranked search results based on selections of past re-reranked search results by the user.

9. A system, comprising:
an Internet-of-Things (IoT) entity component for storing IoT data associated with a user and identifying IoT entities in the IoT data;
a storage for storing a popularity index including popularity scores associated with the IoT entities; and
a processor executing instructions to implement:
a search index for receiving a query provided by the user and obtaining ranked search results including a list of documents relevant to the query, the documents being ranked based on confidence scores associated with the documents; and
an enhanced ranker for re-ranking the ranked search results based on the IoT entities and outputting the re-ranked search results, the re-ranking performed by:
identifying the IoT entities in the IoT data that match entities in the documents to determine co-occurrences;
determining the popularity scores for the identified IoT entities based on the popularity index; and
adjusting the confidence scores associated with the documents based on the co-occurrences and the popularity scores of the identified IoT entities.

10. The system of claim 9, wherein the query provided by the user does not include the IoT entities.

11. The system of claim 9, wherein one of the documents with more occurrences of the IoT entities is re-ranked higher than another one of the documents with fewer occurrences of the IoT entities.

12. The system of claim 9, further comprising:
an IoT data collection component for collecting the IoT data about IoT devices associated with the user.

13. The system of claim 9, wherein the search index generates the popularity scores for the IoT entities.

14. The system of claim 13, wherein the popularity scores are generated based on a trending interest, virality, and/or usefulness of the IoT entities.

15. The system of claim 9, further comprising:
a machine learning model for ranking the documents to provide the ranked search results.

16. A computer-readable storage medium including instructions which, when executed by a processor, cause the processor to:
receive a query provided by a user;
obtain documents based on the query, the documents having initial confidence scores;
identify Internet-of-Things (IoT) entities associated with the user that match entities in the documents to determine co-occurrences;
determine popularity scores for the IoT entities based on a popularity index;
determine adjusted confidence scores associated with the documents based on the co-occurrences and the popularity scores associated with the IoT entities, and the initial confidence scores;
rank the documents based on the adjusted confidence scores; and
output a search result including a list of addresses to the ranked documents, the list of addresses being ordered based on the adjusted confidence scores.

17. The computer-readable storage medium of claim 16, wherein the query provided by the user does not include the IoT entities associated with the user.

18. The computer-readable storage medium of claim 16, wherein one of the documents with more occurrences of the IoT entities is ranked higher than another one of the documents with fewer occurrences of the IoT entities.

19. The computer-readable storage medium of claim 16, wherein the instructions further cause the processor to:
receive IoT data from IoT devices associated with the user;
extract IoT entity names from the IoT data; and
identify the IoT entities by comparing the IoT entity names to a knowledge graph.

20. The computer-readable storage medium of claim 16, wherein the adjusted confidence scores are weighted averages of the popularity scores and the initial confidence scores.

\* \* \* \* \*